United States Patent [19]  [11] 4,033,916
Whelan, Jr.  [45] July 5, 1977

[54] TERNARY FLAME-RETARDED COMPOSITIONS INCLUDING IRON OXIDE

[75] Inventor: William Paul Whelan, Jr., Woodbury, Conn.

[73] Assignee: Uniroyal Inc., New York, N.Y.

[22] Filed: Sept. 10, 1975

[21] Appl. No.: 612,147

Related U.S. Application Data

[63] Continuation-in-part of Ser. No. 515,799, Oct. 17, 1974, abandoned.

[52] U.S. Cl. .................. 260/28.5 A; 260/45.75 P; 260/45.7 R; 260/45.95 G; 260/874; 260/880 R
[51] Int. Cl.² .......................................... C08K 3/22
[58] Field of Search ............... 260/45.75 P, 45.7 R, 260/45.95 G, 28.5 A, 28.5 B, 28.5 R, 874, 880

[56] References Cited

UNITED STATES PATENTS

| | | | |
|---|---|---|---|
| 2,902,460 | 9/1959 | Jennings et al. | 260/45.75 P |
| 3,347,822 | 10/1967 | Jenkner | 260/45.7 R |
| 3,442,980 | 5/1969 | Grabowski | 260/880 |
| 3,729,436 | 4/1973 | Phillips | 260/880 |
| 3,830,766 | 8/1974 | Praetzel et al. | 260/45.7 R |

FOREIGN PATENTS OR APPLICATIONS 808,311 12/1973 Belgium

*Primary Examiner*—V. P. Hoke
*Attorney, Agent, or Firm*—James J. Long

[57] ABSTRACT

New flame-retarded rubber and plastic compositions are disclosed which are economical to produce and which exhibit increased flame-retardance, improved mechanical properties and reduced toxicity. Generally, these new compositions comprise a copolymer of acrylonitrile-butadiene rubber or a terpolymer of acrylonitrile, butadiene and styrene, a bromine- or chlorine-containing organic fire-retardant additive, and an iron oxide.

13 Claims, No Drawings

TERNARY FLAME-RETARDED COMPOSITIONS INCLUDING IRON OXIDE

This is a continuation-in-part of application Ser. No. 515,799, filed Oct. 17, 1974, now abandoned.

THE INVENTION

This invention relates to new flame-retarded rubber or plastic compositions obtained from a copolymer of acrylonitrile and butadiene or a terpolymer of acrylonitrile, butadiene and styrene; an organic fire-retardant additive containing chlorine and/or bromine; and an iron oxide. These new compositions exhibit increased flame-retardancy, improved mechanical properties and reduced toxicity, and are economical to produce.

BACKGROUND OF THE INVENTION

A variety of applications for rubber and plastic compositions based on acrylonitrile-butadiene copolymers and ternary polymers require substantial reduction in the inherent flammability of the compositions. The use of organic compounds of chlorine or bromine as additives for this purpose is known (1). While these additives are effective, the amounts required to impart the desired degree of flame retardancy are frequently great enough to result in substantial detriment to other important properties of the compositions, e.g., mechanical strength (such as tensile and impact strength), modulus, deflection temperature and the like.

1. J. W. Lyons, *The Chemistry and Uses of Fire Retardants* (Wiley—Interscience, 1970), pp. 328–332.

The use of antimony trioxide as a synergistic additive to reduce the amount of halogen compound required in these compositions is also known (2). However, antimony trioxide is costly and its recent history of limited availability and price instability has shown the hazard of reliance on a single material for this purpose. In the case of acrylonitrile-butadiene-styrene (ABS) compositions, antimony trioxide also produces undesirable side-effects on mechanical properties, such as impact strength.

2. Ibid.

Alternatives to the use of antimony trioxide have been reported to be applicable to rubber compositions. Thus, compositions comprising either a natural rubber or a synthetic rubber, such as styrene-butadiene rubber (SBR), a reinforcing black, and a fire-retardant system consisting of a chlorine compound plus calcium borate, zinc borate and iron oxide have been disclosed in Belg. Pat. No. 766,567. Currently, there is no domestic source of the calcium borate required in this system.

Metallic compounds which have been disclosed as fire-retardant additives for ABS include stannic oxide hydrate (3) and compounds of fluorine (U.S. Pat. No. 3,634,311). Weakly effective hydrated metallic compounds, such as hydrated alumina and zinc borate, are also known (4). Chromium carboxylates have also been disclosed (U.S. Pat. No. 3,729,436) in ABS/-polyvinyl chloride blends of approximately 50/50 composition.

3. *J. Fire and Flammability* 3, 130 (1972).
4. *Modern Plastics Encyclopedia* 50 (10A) 236, 718 (1973–74).

Styrene polymers closely related to ABS have been flame-retarded (Belg. Pat. Nos. 643,139; 621,125; Ger. Pat. Nos. 1,282,937; 1,282,938) with combinations of chlorine compounds (or chlorine compounds and bromine compounds) and various metallocenes, metal carbonyls, metal dye complexes, or the like. However, these metallic additives are costly and present disadvantages such as volatility, instability or toxicity. Ferrocene, for example, which is most completely described (in the immediately preceding four patent references) in this usage, is far more costly than antimony trioxide and is volatile at elevated temperatures. Thus, it is an undesirable additive for polymers such as ABS which are processed at high temperatures. Other flame retardant systems for styrene polymers have included metal carboxylates, such as iron naphthenate, in combination with an organic chlorine compound or in combination with both an organic halogen compound and a synergistic hydrocarbon (U.S. Pat. No. 3,595,815; Fr. Pat. No. 1,520,880). The nature of these systems imposes serious limitations on the balance of cost, flammability and other desirable properties obtainable. Likewise, the alternative utilization of lead compounds in these and other systems also poses toxicity hazards.

The use of metal chelates (including ferric acetylacetonate) have also been described (Brit. Pat. No. 1,047,482) in polymers containing at least 50 mole percent of styrene, but these polymers are generally unsuitable for ABS applications.

It is also known (Ger. Pat. No. 1,169,122) that iron halides, such as ferric chloride, can serve as flame retardant additives. However, the sensitivity of these materials to atmospheric moisture seriously limits their utility in polymers.

U.S. Pat. No. 3,766,157 deals with smoke-retardant polymer compositions comprising a styrene polymer and sufficient iron 8-hydroxyquinolate to reduce smoking.

U.S. Pat. No. 3,697,456 teaches the combination of a halogenated organic compound and ferric oxide or other oxides for flame retarding polyurethane foam. These metal oxides are partial, rather than total, replacements for antimony trioxide in polyurethane foam. This is brought out at col. 5, lines 30–33: "Thus surprisingly while the metal oxides used according to the invention are highly effective partial replacements for $Sb_2O_3$, they are not effective when used as total replacements."

French Pat. No. 2,236,893 describes the use of ferric oxide and other metallics to suppress smoke from burning plastics, including ABS and polyvinyl chloride.

THE INVENTION

It has now been found that copolymers and certain terpolymers of butadiene and acrylonitrile, when combined with (a) an organic fire-retardant additive containing chlorine and/or bromine and (b) an iron oxide, provide highly useful, flame-retarded rubber or plastic compositions offering significant advantages over previously known compositions such as described above. The iron oxides, which exert little flame retardant effect in the polymers in the absence of a halogen compound, are powerful synergists for the halogen compounds in these polymers. Further, this combination permits broad latitude in the selection of compounds for specific properties and end uses due to the availability of the variety of halogen compounds and iron oxides useful in this invention.

When the polymer is a nitrile-butadiene rubber (NBR), its combination with a suitable halogen-containing additive and an iron oxide in conjunction with conventional ingredients provides compositions which are highly useful in such applications as flame-resistant hose, conveyor belts and the like. No additional fire retardant additives, such as costly antimony trioxide, are necessary. The compositions may also be formulated, with or without the inclusion of other fire-retardant additives, so as to be self-extinguishing and non-dripping, even in vertical burning tests at low specimen thickness.

When the polymer is a conventional ABS resin, for another example, these combinations provide highly flame-retarded, impact-resistant plastic compositions without the use of costly antimony, chromium or tin additives or toxic fluorine compounds. By Oxygen Index and burning rate criteria, the compositions are far more effectively flame-retarded than analogous compositions containing a wide variety of other metallic compounds.

The compositions of this invention may also be sponged by well-known techniques, such as by the inclusion of blowing agents, to provide low-density, flame-retarded materials useful in such applications as insulation, flotation materials and the like.

Utilization of the iron oxides of the invention in particular permits new advantages in cost, raw material availability and low toxicity. Although the alternative utilization of antimony trioxide is disadvantageous to the mechanical properties of the compositions, the high flame-retardant activity obtainable with low concentrations of the iron oxides permits significant improvements in these characteristics. Moreover, these improvements are retained under increasingly severe processing conditions such as are frequently encountered in practice.

The polymers useful in this invention include acrylonitrile-butadiene rubbers (NBR), ABS polymers (mixtures of an NBR or of a graft terpolymer of acrylonitrile, butadiene and styrene with a styreneacrylonitrile resin) and blends of NBR with ABS or the aforementioned graft terpolymer. Suitable ABS polymers are disclosed in U.S. Pat. No. 3,686,362, col. 1, line 50—col. 3, line 21 and in U.S. Pat. No. 3,809,725, col. 3, lines 15–30. Also operative in this invention are ABS graft copolymers on an EP or EPDM spine, as disclosed in U.S. Pat. No. 3,809,725, col. 3, lines 39–48. The foregoing two patents are hereby incorporated herein by reference. The NBR rubbers are suitably emulsion copolymers of acrylonitrile with butadiene, wherein all or part of the butadiene may be replaced by isoprene and all or part of the acrylonitrile may be replaced by such monomers as methacrylonitrile, alpha-chloracrylonitrile, alpha-bromacrylonitrile and ethacrylonitrile.

The organic, halogen-containing fire retardant additives utilized in this invention are well known (5), being of the class of widely recognized fire-retardant additives for polymers and including chlorine and/or bromine-containing compounds of aliphatic, aromatic, alicyclic or mixed types having a halogen content typically in the range of 35–80% by weight. Substituents other than halogen, such as hydroxyl, anhydride, ether, carboxyl, ester and phosphate, may also be present provided they do not interfere with the fire-retardant activity of the compound when coupled with the iron oxide or otherwise destroy the advantageous properties of the composition. The halogen compounds selected should be substantially non-volatile, stable and non-reactive toward the polymer and any auxiliary ingredients, e.g., rubber curatives, at polymer processing temperatures. Alternatively, inadequately stable halogen compounds may be stabilized with additives, such as commercially available epoxidized soybean oil, for example, so that they are suitably stable to polymer processing temperatures. Mixtures of halogen compounds may also be employed.

5. C. J. Hilado, *Flammability Handbook for Plastics* (Technomic, 1969) and J. W. Lyons, *op. cit.*

Examples of chlorine and bromine compounds useful in the practice of this invention include chlorinated paraffins, marketed under a variety of trademarks, such as "Chlorowax," "Unichlor" and "Cereclor," tetrabromoethane, hexabromobutene-2, tribromoneopentyl alcohol, dibromoneopentyl glycol, dibromobutenediol and its diacetate, methyl pentachlorostearate, and tris (mono- and di-haloalkyl) phosphates, halogenated aromatics such as hexa-, octa- and decabromobiphenyls, decabromodiphenyl oxide, hexabromobenzene, tribromophenol, tetrabromosalicylanilide, tetra(pentabromophenoxy) silane, dibromopropyl chlorobenzoate, dibromopropyl maleate, tetrachloro- and tetrabromophthalic anhydrides, tetrachloro- and tetrabromobisphenol A and their bis-hydroxypropyl derivatives, halogenated cycloaliphatics, such as hexabromocyclododecane, pentabromochlorocyclohexane, bis(cyclohexenyl)-ethylene hexabromide, hexachlorocyclopentadiene (HCCPD) and its derivatives (typically Diels-Alder adducts with normal or cyclic dienes or olefins and including, for example, chlorendic acid, chlorendic anhydride, dimethyl chlorendate, diallyl chlorendate, "Cloran," perchloropentacyclodecane, and HCCPD adducts with furan, benzoquinone, vinylnorbornene, cyclooctadiene, pentadiene and the like).

Where the polymer is ABS, the halogen compound may optionally be polymeric, such as, for example, polyvinyl chloride or chlorinated polyethylene. Polyvinyl chloride is suitably stabilized, for example, by the organotin stabilizers commercially available for this purpose.

The amount of halogen compound to be employed will vary with the specific compound and will be determined by the degree of flame retardation desired and the tolerable limits for other properties. In general, at least 1 part of halogen compound per 100 parts of polymer by weight will be required for useful flame retardancy. Typically, the amount of halogen compound employed will be in the range of 5–70 parts by weight per 100 parts of polymer. Where property requirements permit, however, up to 110 parts by weight of halogen compound may be employed since the synergistic effect of the iron oxides used in combination with the halogen compound is strongly operative in this range. Nevertheless, it is a specific advantage of this invention that the amount of halogen compound required for a given degree of flame retardancy is greatly reduced by its combination with the iron compound.

Iron oxides which may be employed include the anhydrous and hydrated forms of ferric oxide and ferrosoferric oxide and mixtures thereof. In suitable cases, mixtures with other metallic compounds, such as antimony trioxide, may also be employed. The iron oxides are remarkable both in providing higher levels of flame retardancy, such as measured by the Oxygen Index criterion, than those previously obtainable with compounds of other metals and in providing these benefits at low concentrations.

The amount of iron oxide to be employed will, as in the case of the halogen compound, depend on the desired balance between flame-retardancy and other properties, as well as on the specific compound chosen. In general, at least about 0.1 part of iron oxide per 100 parts of polymer by weight will be required for significant flame retardancy beyond that conferred by the halogen compound while the amounts over 50 parts of iron oxide per 100 parts polymer offer little advantage. One to 10 parts of iron oxide per 100 parts of polymer is preferred. One to 2 parts of iron oxide per 100 parts of polymer is most preferred.

The rubber and plastic compositions of this invention are readily obtained by conventional rubber and plastics compounding techniques, and are converted to finished products by processes well known to the art. It is also clear that any amount of polymer smaller than that desired for the final composition may be combined with the iron and halogen compounds by suitable techniques, the resulting concentrate (or masterbatch) being combined subsequently with additional polymer in the conventional manner. Such a procedure can be useful in facilitating dispersion of the fire-retardant components in the final composition. With reference to the concentrate, it is, of course, also possible to substitute for the polymer, in whole or in part, such other polymers as will be suitable to the processing and properties of the final composition and will not prevent operation of the fire-retardant system. Processing aids and/or other ingredients which meet the same requirements may be included in the concentrate in addition.

The invention and the preparation of flame-retarded rubber or plastic compositions will become more clear from the examples below which are set forth as being illustrative of the invention and are not intended to be, nor should they be construed as being, limitative thereof. In the examples, compounding of ABS test specimens was carried out in a conventional manner on a rubber/plastics mill. Slab specimens were compression molded, and were cut to size and finished as appropriate to the test method. The ABS polymer employed was a 50/50 weight percent graft terpolymer-resin blend containing 22% acrylonitrile, 23% butadiene and 55% styrene. The graft terpolymer was a 90/10 butadiene/styrene emulsion copolymer rubber onto which had been graft polymerized a 70/30 weight percent mixture of styrene and acrylonitrile. The resinous component was a conventional emulsion polymerized 70/30 weight percent styrene/acrylonitrile copolymer.

The below-named halogen compounds are among those utilized in the Examples:

"Cloran": 1,2,3,4,9,9-hexachloro-1,4,4a,5,6,7,8,8a-octahydro-1,4-methanonaphthalene-6,7-dicarboxylic anhydride.

Dechlorane 602 Hooker Chemical Corp.: a cycloaliphatic chloride; melting point, 290°–293° C.; density (gms/cc) at 25° C. = 2.0; chlorine content (%) = 69.4.

Polyvinyl chloride: Marvinol 23, a general purpose resin of medium molecular weight, having an intrinsic viscosity (ASTM D-1243-66) = 0.93, a specific gravity of 1.40 and an oil absorption, cc/gm (ASTM D-281) of 0.9.

Testing of the specimens was carried out as follows:
1. Oxygen Index: ASTM Method D-2863, "Flammability of Plastics Using the Oxygen Method." Oxygen index is the minimum concentration of oxygen, expressed as percent by volume, in a slowly rising mixture of nitrogen and oxygen, that will just support the combustion of a material burning under equilibrium conditions of candle-like burning. Higher Oxygen Index indicates decreased relative flammability. Since the method provides a continuous numerical scale for the assignment of relative flammability ratings, it is especially appropriate for illustrating differences in the degree of flame retardation provided by additives and additive combinations. "ΔOI" in all Examples represents the increase in the Oxygen Index provided by the additive or combination over that of the base polymer.

2. Horizontal Burning Rate and Vertical Burning Test performance were determined in substantial accordance with the procedures below, with indicated departures as to number of specimens tested and elimination of preconditioning as appropriate:

a. Horizontal: ASTM D-635-63, "Test for Flammability of Rigid Plastics." Three or more specimens of the dimensions indicated were employed per test. Compositions which failed to burn to the 4-inch mark are designated in the Examples as "SE" (self-extinguishing), while compositions which failed to burn to the 1-inch mark are designated "NB" (non-burning).

b. Vertical: UL Subject 94 Vertical Burning Test for Classifying Materials 94-V-0, 94-V-1, or 94-V-2. Five 5 × ½ inch slab specimens, in the thickness indicated, of each composition were tested in "as prepared" condition.

EXAMPLE 1

This Example illustrates the powerful flame retardant effect provided by combinations of an iron oxide with a halogen compound in a suitable polymer, as shown in (g)–(j), in contrast to the weak effect of the iron oxide or halogen compound alone, as shown in (a)–(f).

Polymer: ABS resin

| | Halogen Compound | pph | Iron Oxide | pph | Oxygen Index | ΔOI |
|---|---|---|---|---|---|---|
| (a) | None | — | None | — | 18.5 | — |
| (b) | None | — | Ferric Oxide | 1 | 19.6 | +1.1 |
| (c) | Polyvinyl chloride* | 20 | None | — | 21.7 | +3.2 |
| (d) | "Cloran" | 30 | None | — | 20.9 | +2.4 |
| (e) | Hexabromocyclododecane | 15 | None | — | 22.6 | +4.1 |
| (f) | Tetrabromobisphenol A | 19.3 | None | — | 22.2 | +3.7 |
| (g) | Polyvinyl chloride* | 20 | Ferric Oxide | 1 | 33.7 | +15.2 |
| (h) | "Cloran" | 30 | Ferric Oxide | 1 | 27.2 | +8.7 |
| (i) | Hexabromocyclododecane | 15 | Ferric Oxide | 1 | 28.7 | +10.2 |
| (j) | Tetrabromobisphenol A | 19.3 | Ferric Oxide | 3.7 | 29.9 | +11.4 |

*Stabilized with Thermolite 31, an organotin mercaptide stabilizer for polyvinyl chloride marketed by M & T Chemicals, Inc.

Polymer: Rubber A

| | Halogen Compound | pph | Iron Oxide | pph | Oxygen Index | ΔOI |
|---|---|---|---|---|---|---|
| (k) | None | — | None | — | 19.3 | — |
| (l) | None | — | Ferric Oxide | 1 | 19.0 | ~0 |
| (m) | None | — | Ferric Oxide | 5 | 20.9 | +1.6 |
| (n) | Tetrachlorobisphenol A | 29 | None | — | 20.0 | +0.7 |
| (o) | Hexabromobiphenyl | 14.7 | None | — | 21.9 | +2.6 |
| (p) | Hexabromocyclododecane | 15 | None | — | 22.7 | +3.4 |
| (q) | Tetrachlorobisphenol A | 29 | Ferric Oxide | 4.2 | 28.8 | +9.5 |
| (r) | Hexabromobiphenyl | 14.7 | Ferric Oxide | 3.7 | 26.3 | +7.0 |

-continued

| Polymer: Rubber A | | | | | |
|---|---|---|---|---|---|
| Halogen Compound | pph | Iron Oxide | pph | Oxygen Index | ΔOI |
| (s) Hexabromocyclodecane | 15 | Ferric Oxide | 3.7 | 27.1 | +7.8 |

Rubber A and Rubber B are acrylonitrile/butadiene copolymer rubbers having respectively 32.5% and 44.5% by weight of acrylonitrile. The NBR compositions were compounded in a conventional manner on a rubber mill, and were cured with the following system:
Zinc oxide = 5 pph
Stearic acid = 1 pph
MBTS = 2.1 pph
Monex = 0.4 pph
Sulfur = 2.5 pph
Slab samples were compression molded for 30 minutes at 330° F. Moldings were cooled prior to removal from the press, and specimens were cut to size for testing.

EXAMPLE 2

This Example demonstrates the operability of other iron oxides in combination with a halogen compound in ABS resin and includes test data for antimony trioxide to illustrate the higher effectiveness of the iron oxides.

| Halogen Compound: Polyvinyl chloride*, 20 pph | | | |
|---|---|---|---|
| Metal Compound | pph | Oxygen Index | ΔOI |
| (a) None | — | 21.7 | +3.2 |
| (b) Ferrosoferric Oxide | 1 | 30.2 | +11.7 |
| (c) Yellow Iron Oxide** | 1 | 32.0 | +13.5 |
| (d) Antimony Trioxide | 1 | 22.6 | +4.1 |
| (e) Antimony Trioxide | 5 | 25.1 | +6.6 |
| (f) Antimony Trioxide | 10 | 30.3 | +11.8 |

*Stabilized with Thermolite 31.
**"Mapico Yellow 1050", marketed by Columbian Carbon Co.

EXAMPLE 3

This Example demonstrates the high effectiveness of an iron oxide in combination with a halogen compound in flame-retarding NBR rubber compositions in comparison to the effect of the halogen compound either alone or in combination with antimony trioxide. "Chlorowax 70," a chlorinated paraffin, is a commercial product containing about 70% by weight chlorine and having a specific gravity of 1.65. "MBTS" denotes benzothiazyl disulfide and "Monex" is a commercial product containing tetramethylthiuram monosulfide.

The test data above reveal that ferric oxide augments the flame-retardant effect of the chlorine or bromine compounds more effectively than does antimony trioxide (it being noted also that much less of the ferric oxide was used in relation to the amount of antimony trioxide), and that this advantage is obtained in rubbers of both high and low nitrile content.

EXAMPLE 4

This Example demonstrates that the high effectiveness of the iron oxide/halogen compound combinations in flame-retarding the polymer compositions is also manifested in horizontal burning tests. In the data listed below, the specimen used measured 5 × ½ × ⅛ inches, and "NB" denotes non-burning, i.e., the flame failed to reach the 1-inch starting line for burning rate determinations.

| Polymer: ABS | | | |
|---|---|---|---|
| Halogen Compound: Polyvinyl chloride*, 20 pph | | | |
| Iron Compound | pph | Oxygen Index | Horizontal Burning Rate (in./min.) |
| (a) None | — | 21.7 | 0.6 |
| (b) Ferric Oxide | 4.2 | 36.2 | NB |
| (c) Ferrosoferric Oxide | 5 | 33.7 | NB |

*Stabilized with Thermolite 31.

EXAMPLE 5

This Example demonstrates that the high effectiveness of iron oxide/halogen compound combinations in flame-retarding the polymer compositions is also manifested in vertical burning tests. Comparative data for antimony trioxide are also shown. Dechlorane 602, a commercial fire-retardant, is a cycloaliphatic chloride containing 69.4% chlorine by weight and marketed by Hooker Chemical Corporation.

| Polymer: Rubber A | | | | | |
|---|---|---|---|---|---|
| Halogen Compound | pph | Additive | pph | Oxygen Index | Vertical Burning Test* |
| Dechlorane 602 | 32.4 | Antimony Trioxide | 10 | 28.0 | Fails* |
| Dechlorane 602 | 32.4 | Ferric Oxide | 8.4 | 28.9 | 94-V-1ᶜ |

*⅛" thick specimens.
*Each of 5 specimens continued to burn more than 30 seconds after first or second ignition.
ᶜEach of 5 specimens extinguished in 25 seconds or less after each ignition.

| Polymer | Halogen Compound | pph | Metallic Compound | pph | Oxygen Index | ΔOI |
|---|---|---|---|---|---|---|
| (a) Rubber A | None | — | None | — | 19.3 | — |
| (b) " | Chlorowax 70 | 16 | None | — | 21.5 | +2.2 |
| (c) " | Chlorowax 70 | 16 | Antimony Trioxide | 10 | 23.3 | +4.0 |
| (d) " | Chlorowax 70 | 16 | Ferric Oxide | 4.2 | 24.1 | +4.8 |
| (e) Rubber B | None | — | None | — | 22.6 | — |
| (f) " | Chlorowax 70 | 16 | None | — | 22.5 | 0 |
| (g) " | Chlorowax 70 | 16 | Antimony Trioxide | 10 | 25.0 | +2.4 |
| (h) " | Chlorowax 70 | 16 | Ferric Oxide | 4.2 | 27.8 | +5.2 |
| (i) Rubber A | Tetrabromobisphenol A | 19.3 | None | — | 22.1 | +2.8 |
| (j) " | Tetrabromobisphenol A | 19.3 | Antimony Trioxide | 6.9 | 24.4 | +5.1 |
| (k) " | Tetrabromobisphenol A | 19.3 | Ferric Oxide | 3.7 | 26.4 | +7.1 |

EXAMPLE 6

This Example illustrates the greater effectiveness of ferric oxide as compared to compounds of other elements in flame-retarding a polymer composition containing a halogen compound. In the data listed below, "NB" is the same as identified in Example 4, "SE" denotes failure to burn to the 4-inch mark, and the data for stannic oxide hydrate as additive are excerpted from *J. Fire j Flammability* 3, 136 (1972).

Polymer: ABS resin
Halogen Compound: Polyvinyl chloride*, 20 pph

| Additive | pph | Oxygen Index | Horizontal Burning Rate (in/min) |
|---|---|---|---|
| (a) None | — | 21.7 | 0.6 |
| (b) Zinc Oxide | 10 | — | 1.3 |
| (c) Barium Metaborate | 10 | — | 0.9 |
| (d) Magnesium Oxide | 10 | — | 0.8 |
| (e) Cadmium Oxide | 10.1 | 21.3 | 0.8 |
| (f) Aluminum Oxide | 10 | — | 0.8 |
| (g) Lead Monoxide | 17.6 | 22.1 | 0.7 |
| (h) Zirconium Oxide | 10 | — | 0.6 |
| (i) Silica | 10 | — | 0.6 |
| (j) Boron Oxide | 10 | — | 0.6** |
| (k) Titanium Dioxide | 10 | — | 0.6** |
| (l) Tungsten Trioxide | 9.1 | 22.5 | 0.3** |
| (m) Bismuth Trioxide | 12.3 | 22.7 | 0.4** |
| (n) Cuprous Oxide | 11.3 | 22.4 | SE |
| (o) Chromic Oxide | 4.0 | 23.1 | SE |
| (p) Chromium Acetate | 6.5 | 21.5 | — |
| (q) Chromic Citrate | 7.8 | 21.1 | — |
| (r) Manganous Carbonate | 9.1 | 24.1 | — |
| (s) Arsenic Trioxide | 5.2 | 24.4 | NB |
| (t) Stannous Oxide | 10.6 | 24.5 | NB |
| (u) Stannic Oxide | 6 | 25.2 | NB |
| (v) Antimony Trioxide | 7.7 | 30.1 | NB |
| (w) Ferric Oxide | 4.2 | 36.2 | NB |

Halogen Compound: Perchloropentacyclodecane, 25 pph

| (x) Stannic Oxide Hydrate | 10 | 26.0 | — |

*Stabilized with Thermolite 31.
**Some specimens were either SE or NB.

EXAMPLE 7

This Example demonstrates that the presence of ferric oxide greatly reduces the amount of halogen compound needed for a given degree of flame retardancy in a polymer composition.

Polymer: ABS

| Halogen Compound | pph | Iron Compound | pph | Oxygen Index |
|---|---|---|---|---|
| (a) None | — | None | — | 18.5 |
| (b) Polyvinyl Chloride* | 20 | None | — | 21.7 |
| (c) Polyvinyl Chloride* | 1 | Ferric Oxide | 0.2 | 21.4 |
| (d) Polyvinyl Chloride* | 1 | Ferric Oxide | 1 | 23.0 |
| (e) "Cloran" | 30 | None | — | 20.9 |
| (f) "Cloran" | 5 | Ferric Oxide | 1 | 24.6 |

*Stabilized with Thermolite 31.

EXAMPLE 8

This Example illustrates the advantages of using ferric oxide in place of antimony trioxide in providing polymer compositions of high flame retardancy and improved impact strength. In the data below, the samples used in the Notched Izod Impact Test were ⅛ inch compression molded specimens.

Polymer: ABS

| Halogen Compound | pph | Metal Compound | pph | Oxygen Index | Notch Izod Impact Strength |
|---|---|---|---|---|---|
| (a) Polyvinyl Chloride* | 20 | None | — | 21.7 | 8.0 |
| (b) Polyvinyl Chloride* | 20 | Antimony Trioxide | 10 | 30.3 | 3.8 |
| (c) Polyvinyl Chloride* | 20 | Ferric Oxide | 11 | 33.7 | 6.1 |
| (d) "Cloran" | 5 | None | — | 19.5 | 4.0 |
| (e) "Cloran" | 5 | Antimony Trioxide | 5 | 21.3 | 3.1 |
| (f) "Cloran" | 5 | Antimony Trioxide | 11 | 22.4 | 2.2 |
| (g) "Cloran" | 5 | Ferric Oxide | 1 | 24.6 | 4.2 |

*Stabilized with Thermolite 31.

EXAMPLE 9

This Example illustrates that the advantageous effect of ferric oxide over antimony trioxide on the impact strength of ABS compositions containing a halogen compound is retained under increasingly severe processing conditions. In this Example, the samples used were ⅛ inch compression molded specimens and the ABS compositions, identified by letters "A," "B," "C" and "D," were milled prior to molding under the following conditions: "A," 10 min. at 340° F.; "B," 30 min. at 340° F.; "C," 30 min. at 400° F.; and "D," 60 min. at 400° F.

| | Notched Izod Impact Strength (ft.lbs/inch notch) | |
|---|---|---|
| Additives (pph) | "Cloran"/Antimony Trioxide (30/11) | "Cloran"/Ferric Oxide (30/1) |
| Compn. A | 0.6 | 0.9 |
| B | 0.5 | 0.8 |
| C | 0.4 | 0.6 |
| D | 0.5 | 1.0 |

EXAMPLE 10

This Example further illustrates that the synergistic effect of ferric oxide in combination with a suitable halogen compound in the polymer is operative over a broad range of concentrations of the halogen compound.

Polymer: ABS
Halogen Compound: Polyvinyl Chloride*

| | Halogen Compound Concentration, pph | Ferric Oxide pph | Oxygen Index | ΔOI |
|---|---|---|---|---|
| (a) | 5 | 0 | 20.8 | +2.3 |
| (b) | 5 | 1.1 | 29.5 | +11.0 |
| (c) | 10 | 0 | 20.9 | +2.4 |
| (d) | 10 | 1.1 | 32.3 | +13.8 |
| (e) | 20 | 0 | 21.7 | +3.2 |
| (f) | 20 | 1 | 33.7 | +15.2 |
| (g) | 110 | 0 | 27.4 | +8.9 |
| (h) | 110 | 5 | 34.6 | +16.1 |

*Stabilized with Thermolite 31.

Vertical burning tests of compositions (g) and (h), 1/16 inch thick specimens, gave the following results:

g. average specimen burning time per flame application: 12.1 seconds; one of five specimens failed to meet the 30-second burning time test limit.

h. av. spec. burning time: 2.3 seconds; 94-V-0 rating.

| Polymer: Rubber A Halogen Compound: Dechlorane 602 | | | |
|---|---|---|---|
| Halogen Compound Concentration, pph | Ferric Oxide pph | Oxygen Index | ΔOI |
| (i) 1 | 0 | 19.1 | ~0 |
| (j) 1 | 1 | 19.7 | +0.4 |

| Polymer: Rubber B Halogen Compound: Chlorowax 70 | | |
|---|---|---|
| Halogen Compound Concentration, pph | Ferric oxide pph | Vertical Burning Test[1] |
| (k) 110 | 10 | Failed[2] |
| (l) 110 | 10 | 94-V-1[3] |

[1]1/16" thick specimens.
[2]4 of 5 specimens failed; average specimen flaming combustion time per flame aplication: 21 seconds.
[3]Average specimen flaming combustion time per flame application: 9 seconds.

What is claimed is:

1. A composition comprising an organic polymer selected from the group consisting of acrylonitrile-butadiene rubber and a plastic terpolymer of acrylonitrile, butadiene and styrene, and: (a) from 1 to 110 parts by weight per 100 parts by weight of said organic polymer of a non-polymeric organic additive selected from the group consisting of chlorine-substituted and bromine-substituted alliphatic, aromatic and alicyclic hydrocarbyl compounds having a halogen content in the range of from 35 to 80 weight percent and optionally containing oxygen substituents in the form of hydroxyl, anhydride, ether, carboxyl, ester or phosphate groups and which can alternatively be polymeric when said organic polymer is said plastic terpolymer and which are substantially non-volatile and stable at polymer processing temperatures, and mixtures thereof; and (b) from 0.1 to 50 parts by weight of said organic polymer of an iron oxide selected from the group consisting of the anhydrous and hydrated forms of ferric oxide and ferrosoferric oxide and mixtures thereof.

2. A composition comprising an organic polymer selected from the group consisting of acrylonitrile-butadiene rubber and a plastic terpolymer of acrylonitrile, butadiene and styrene, and: (a) from 1 to 110 parts by weight per 100 parts by weight of said organic polymer of a non-polymeric organic additive selected from the group consisting of chlorine-substituted and bromine-substituted aliphatic, aromatic and alicyclic hydrocarbyl compounds having a halogen content in the range of from 35 to 80 weight percent and optionally containing oxygen substituents in the form of hydroxyl or anhydride groups and which can alternatively be polymeric when said organic polymer is said plastic terpolymer and which are substantially non-volatile and stable at polymer processing temperatures, and mixtures thereof; and (b) from 0.1 to 50 parts by weight per 100 parts by weight of said organic polymer of an iron oxide selected from the group consisting of the anhydrous and hydrated forms of ferric oxide and ferrosoferric oxide and mixtures thereof.

3. The composition of claim 2 in which said organic polymer is acrylonitrile-butadiene rubber.

4. The composition of claim 2 in which said organic polymer is a plastic graft terpolymer of acrylonitrile, butadiene and styrene.

5. The composition of claim 2 in which said organic polymer is said plastic terpolymer and said organic additive is polyvinyl chloride.

6. The composition of claim 2 in which said organic additive is tetrabromobisphenol A.

7. The composition of claim 2 in which said organic additive is hexabromocyclododecane.

8. The composition of claim 2 in which said organic additive is a cycloaliphatic chlorine compound.

9. The composition of claim 2 in which said organic additive is chlorine-containing paraffin wax.

10. The composition of claim 2 in which said iron oxide is ferric oxide.

11. The composition of claim 2 in which said iron oxide is yellow iron oxide.

12. The composition of claim 2 in which said iron oxide is ferrosoferric oxide.

13. The composition of claim 2 in which said iron oxide is a mixture of iron oxides consisting of ferric oxide and ferrosoferric oxide.

* * * * *